(12) United States Patent
Dilliner

(10) Patent No.: US 6,806,610 B2
(45) Date of Patent: Oct. 19, 2004

(54) MAGNETIC MOTOR WITH MOVABLE ROTOR AND DRIVE MAGNETS

(76) Inventor: Monte Dilliner, P.O. Box 177, Lineville, IA (US) 50147

( * ) Notice: Subject to any disclaimer, the term of this patent is extended or adjusted under 35 U.S.C. 154(b) by 144 days.

(21) Appl. No.: 10/085,574

(22) Filed: Feb. 27, 2002

(65) Prior Publication Data

US 2002/0117924 A1 Aug. 29, 2002

Related U.S. Application Data

(60) Provisional application No. 60/271,706, filed on Feb. 27, 2001.

(51) Int. Cl.[7] .............................................. H02K 1/00
(52) U.S. Cl. ...................... 310/181; 310/191; 310/209
(58) Field of Search .................... 310/156.01–156.84, 310/261, 264, 266, 267, 112, 114, 115, 116, 21, 15, 117, 68 B, 103–111, 209, 191, 76–77, 93

(56) References Cited

U.S. PATENT DOCUMENTS

| | | | | |
|---|---|---|---|---|
| 3,469,130 A | * | 9/1969 | Jines et al. ............ | 310/154.49 |
| 3,968,470 A | | 7/1976 | Brown ....................... | 335/230 |
| 4,125,790 A | * | 11/1978 | Stratienko .................. | 310/75 D |
| 4,305,024 A | | 12/1981 | Kuroki ........................ | 318/254 |
| 4,314,169 A | | 2/1982 | Rusu ............................ | 310/46 |
| 4,375,587 A | * | 3/1983 | Perl ............................ | 219/721 |
| 4,494,023 A | | 1/1985 | Cook .......................... | 310/21 |
| 4,517,477 A | * | 5/1985 | Pankratz ..................... | 310/23 |
| 5,365,134 A | * | 11/1994 | Mason et al. ............... | 310/114 |
| 5,455,474 A | | 10/1995 | Flynn ......................... | 310/181 |
| 5,581,136 A | | 12/1996 | Li ............................... | 310/67 |
| 5,763,977 A | * | 6/1998 | Shimasaki et al. .......... | 310/191 |
| 5,877,566 A | | 3/1999 | Chen .......................... | 310/63 |
| 6,005,317 A | * | 12/1999 | Lamb .......................... | 310/103 |
| 6,084,281 A | | 7/2000 | Fullin et al. ................ | 257/422 |
| 6,249,069 B1 | * | 6/2001 | Krueger ....................... | 310/74 |

* cited by examiner

Primary Examiner—Darren Schuberg
Assistant Examiner—Heba Y. Elakssabgi
(74) Attorney, Agent, or Firm—G. Brian Pingel; Camille L. Urban

(57) ABSTRACT

The invention provides a magnetic motor wherein a plurality of rotor magnets are positioned along a rotor which is mounted to a shaft. A plurality of drive magnets are movably positioned generally adjacent to the rotor magnets. Relative motion of the drive magnets into and out of juxtaposed positions with the rotor magnets controls relative torque of the shaft. The drive magnets are electrically pulsed through a timing assembly.

17 Claims, 5 Drawing Sheets

MAGNETIC MOTOR WITH MOVABLE ROTOR AND DRIVE MAGNETS

This application claims the benefit of provisional application Ser. No. 60/027,706 filed Feb. 27, 2001.

FIELD OF THE INVENTION

The present invention is related to magnetic motors and more particularly to a rotating magnetic motor having a magnet recharging mechanism.

BACKGROUND OF THE INVENTION

DC magnetic motors having an armature supported between magnetic pole pieces are well known in the industry. While these magnetic motors have been utilized in small applications such as axillary motors, they often lack the necessary efficiency for driving larger machinery or assemblies.

One example of a DC magnetic motor assembly is shown in U.S. Pat. No. 5,365,134. This patent teaches a direct current motor formed by an armature interposed between opposing magnetizable members which are magnetized by permanent magnets or coils extending between the members. The magnets or coils are energized by a DC source. Elongated members are disposed normal to and connected with the respective magnetized member to form opposing pairs of opposite polarity poles disposed in diametric opposition on the armature.

U.S. Pat. No. 4,517,477 discloses a magnetic motor having a plurality of permanent magnets arranged to have spaced apart alternating opposite poles around the rotor. A stator magnet alternately attracts the first pole and repels the second pole of each sequential permanent magnet to cause rotation. Magnetic means defining a stator alternates between a first phase of attracting the first pole of a given magnet and a second phase of repelling the second pole of the given magnet. Timing means detect the position of the magnet and signal magnetic means for alternating between the first and second phases. The magnets may include spaced apart permanent magnets each having the same pole directed towards the rotor. A solenoid responsive to the timing means selectively and alternatively positions the stator magnets in close proximity to the rotor for alternatively attracting or repelling the rotor magnets. The phases are accomplished by a single pole of a single permanent magnet having a field which is periodically nullified by the electric means responsive to the timing means.

Although these and other magnetic motors provide ample speed and torque in certain applications, it is desirable to produce a magnetic motor capable of efficiently delivering high torque at variable speeds.

SUMMARY OF THE INVENTION

The invention provides a magnetic motor wherein a plurality of rotor magnets are positioned along a rotor which is mounted to a shaft. A plurality of drive magnets are movably positioned generally adjacent to the rotor magnets. Relative motion of the drive magnets into and out of juxtaposed positions with the rotor magnets controls relative torque of the shaft. The drive magnets are electrically pulsed through a timing assembly.

BRIEF DESCRIPTION OF THE DRAWINGS

The invention will now be described by way of example with reference to the accompanying figures of which.

DETAILED DESCRIPTION OF THE PREFERRED EMBODIMENT

Figure 1:
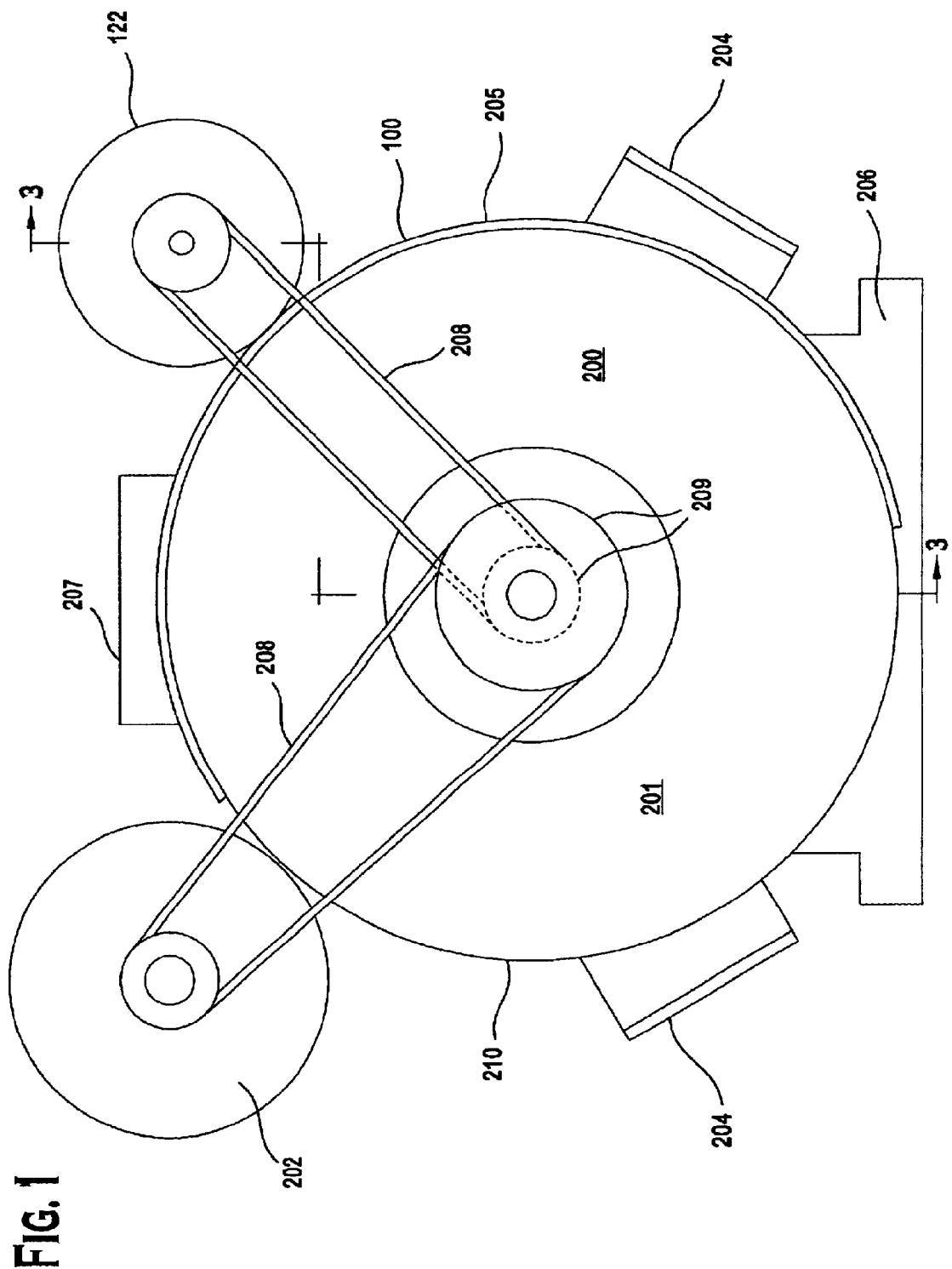
FIG. 1 is a front view of the magnetic motor according to the present invention.
Figure 2:
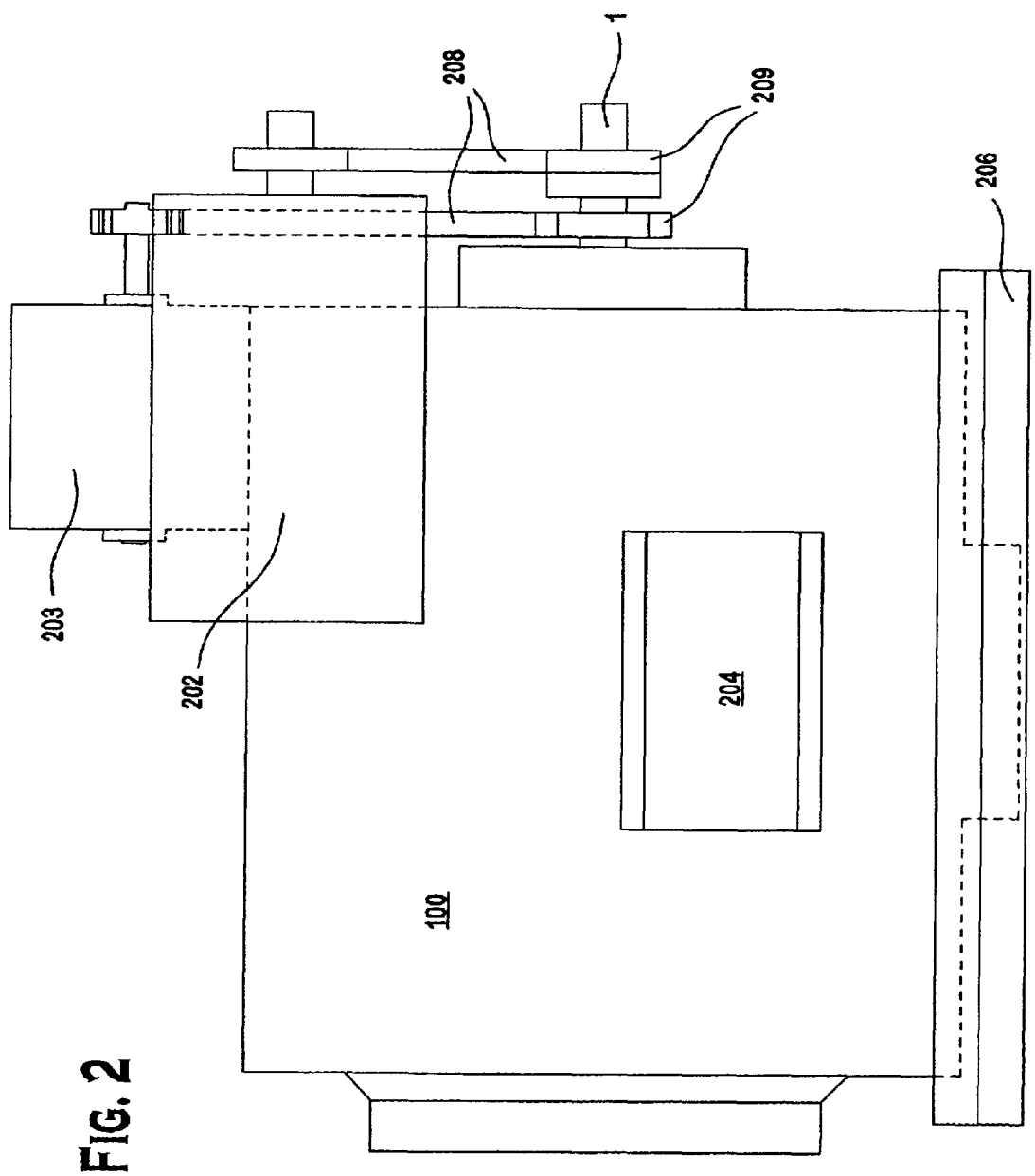
FIG. 2 is a side view of the magnetic motor shown in FIG. 1.

The magnetic motor according to the present invention will first be described generally with reference to FIGS. 1 and 2. The main components of the magnetic motor assembly 200 are housed within an outer housing 100 having a front plate 201, a rear plate 98 (FIG. 3) and a side housing 210. A housing stiffner 205 is provided around a portion of the periphery of the side housing 210. Motor mounts 204, 206 extend from the side housing 210 at desired locations and can be moved or interchanged for various mounting arrangements. A control housing 207 is provided also along a periphery of the side housing 210. A main shaft 1 extends out of the front plate 201 and through the outer housing 100 as will be described below. Pulleys 209 are mounted on the main shaft 1 outside of the front plate 201. Belts 208 are connected to the pulleys 209 for driving both an alternator 202 and a timing assembly 122. Both the alternator 202 and the timing assembly 122 are fixed to the outer housing 100 along a periphery of the side housing 210.

The major components, including the magnetic motor assembly 200, the alternator 202 and the timing assembly 122 will now be described in greater detail.

Figure 3:
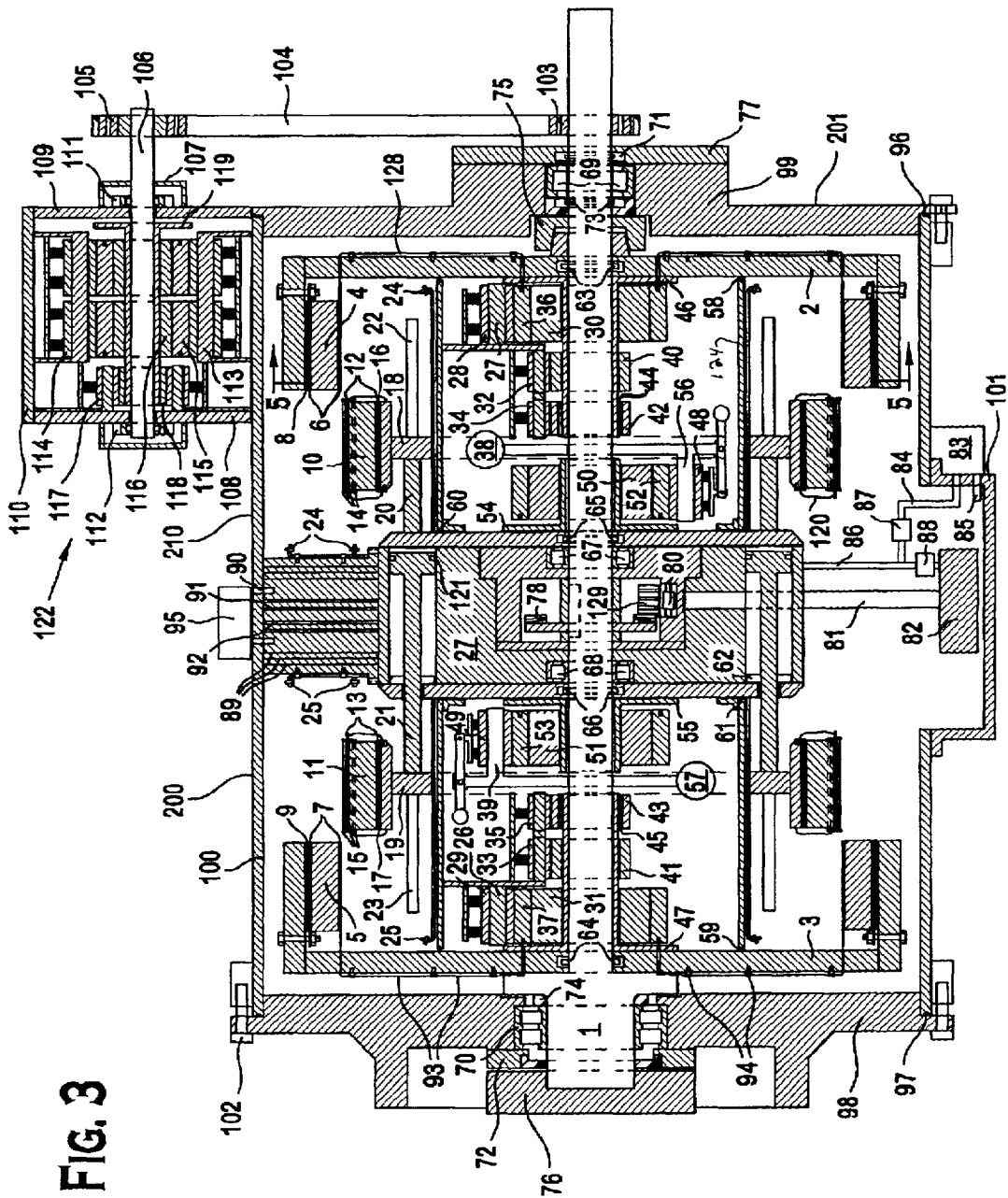
FIG. 3 is a cross-sectional view taken along the line 3—3 of FIG. 1.

Referring first to FIG. 3, the magnetic motor assembly 200 is shown in cross-section. The front plate 201 and rear plate 98 are fixed to the outer housing 100 by housing bolts 102 or other appropriate fasteners. Front housing seals 96 are provided at the interface between the front plate 201 and the outer housing 100. Similarly, rear housing seals 97 are provided at the interface between the rear plate 98 and the outer housing 100.

The main shaft 1 extends through the front plate 201 and into the rear plate 98. The main shaft 1 is supported within the front plate 201 by a front case bearing 69. An outer seal 71 and an inner seal 73 extend around the shaft 1 on opposite sides of the front case bearing 69. Similarly, a rear case bearing 70 is provided around the rear end of the main shaft 1 inside the rear plate 98. A rear case outer seal 72 and a rear case inner seal 74 are provided on the main shaft 1 on either side of the rear case bearing 70. A front rotor 2 and a rear rotor 3 are fixed to the main shaft at front and rear ends respectively. A front rotor hub locking collar 75 is secured to the front rotor 2 and main shaft 1. A front rotor seal 63 is located within the front rotor to main shaft interface.

Moving along the main shaft 1 from the front rotor 2 rearward within the outer housing 100, a front commutator hub 46 is provided around the shaft 1. A front rotor magnet recharge commutator 36 extends around the front commutator hub 46 and is separated therefrom by a front rotor magnet recharge commutator insulator 30. A front rotor magnet recharge brush holder 27 is located around the front rotor magnet recharge commutator 36 and holds a front rotor magnet recharge brush 28. In this embodiment there are an angularly spaced plurality of conductive sections on the front rotor magnet recharge commutator 36 which electrically each engage the brush 28 during rotation. A front inner drum housing 124 surrounds these and other components which will be described in further detail. Front oil spray nozzles 24 are provided outside the front inner drum housing 124 for distributing cooling oil. Continuing along the shaft, still within the front inner drum housing 124, a front ground slip ring 40 is provided around the shaft 1 along the front commutator hub 46. A front shaft ground brush 32 is in contact with the front ground slip ring 40. Similarly, a front spinning brush slip ring insulator 44 is provided along the front commutator hub 46 rearward of the front ground slip ring 40. A front spinning brush slip ring 42 surrounds the front spinning brush slip ring insulator 44 and a front slip ring brush 34 contacts the front spinning brush slip ring 42. A front stationary commutator hub 54 is located within the rear end of the front inner drum housing 124. The front stationary commutator hub 54 is fixed to a front manifold plate 126 from which the front inner drum housing also extends. There is a slight gap between the shaft 1 and the front stationary commutator hub 54. A front stationary commutator insulator 50 surrounds the front stationary commutator hub 54. A front stationary commutator 52 is supported on the front stationary commutator insulator 50 and a front spinning brush holder 56 extends from the main shaft 1 to allow front drive magnet recharge brushes 48 to contact the front stationary commutator 52. In this embodiment there are preferably a plurality of angularly spaced front drive magnet recharge brushes 48. A front spinning brush holder counterweight 38 is provided along the front spinning brush holder 56 at an end opposite the front drive magnet recharge brushes 48.

Extending from the front manifold plate 126 toward the front plate 201 are a front drive magnet plunger 20 and front drive hub guide pins 22 within the front drive magnet plunger 20. A front drive magnet hub 18 is secured to the front drive magnet plunger 20. The front drive magnet hub 18 supports front drive magnet insulators 16 on which are mounted front drive magnet plates 12 surrounding front drive magnets 10. A front drive magnet coil 14 is longitudinally wound around each magnet 10.

Turning now to the central region of the magnetic motor assembly 200, a center manifold 123 is disposed about the shaft 1 approximately in the center between the front and rear plates 201, 98. The center manifold 123 is retained within the magnetic motor assembly 200 by bolts 90 fastened to the side housing 210. A manifold front plate seal 65 is provided within the manifold plate 126 around the shaft 1 and manifold front plate bearing 67 is located around the shaft to support the center manifold 123 about the shaft 1. An oil pump drive gear 78 is provided within the center manifold 123. The oil pump drive gear 78 drives an oil pump shaft gear 79 which engages an oil pump shaft 81. An oil pump shaft bearing 80 is provided at the interface between the oil pump shaft 81 and the oil pump shaft gear 79. An oil pump 82 submersed in an oil pan 101 which is positioned along an opening in the side housing 210 near the bottom of the magnetic motor assembly 200 is driven by the oil pump shaft 81 to provide cooling oil flow and pneumatic control through the inside of the magnetic motor assembly 200. Exiting the oil pump 82 is an oil pressure line 86 extending from a first check valve 88. A second electric oil pump 83 is provided external to the oil pan 101. The electric oil pump 83 has an electric oil pump inlet 85 for drawing oil from the oil pan 101. An electric oil pump pressure line 84 exits the electric oil pump 83 through a second check valve 87 into the oil pressure line 86. Oil lines 91, 92 extend from the oil pressure line 86 and distribute cooling oil to the front oil spray nozzles 24 and rear oil spray nozzles 25 which are positioned in the vicinity of rotor magnets 4, 5 and drive magnets 10, 11 where heat is generated during operation. The oil pressure line 86 is coupled to the front drive magnet plunger 20 for controlling the position of the front drive magnet hub 18. A hydraulic valve 95 is provided and connected to the oil lines 91, 92 for controlling the oil pressure in these oil lines 91, 92.

The front inner drum housing 124 is sealed from ingress of oil flow by a front drum seal 58 positioned at the front end and a second front drum seal 60 positioned at the rear end where the front inner drum housing 124 meets the front manifold plate 126.

Rearward of the central region as best shown in FIG. 3, the magnetic motor assembly 200 is generally symmetrical to the front portion already described. First, a manifold rear plate seal 66 is provided around the shaft 1 inside the rear manifold plate 127. A rear stationary commutator hub 55 is fixed to the rear manifold plate 127 and has a small gap from the shaft 1. A rear stationary commutator insulator 51 surrounds the rear stationary commutator hub 55. A rear stationary commutator 53 is positioned around the rear stationary commutator insulator 51. A rear spinning brush holder 39 supports rear drive magnet recharge brushes 49 which electrically contact the rear stationary commutator 53. A rear spinning brush holder counterweight 57 is provided along the rear spinning brush holder 39 opposite the rear drive magnet recharge brush 49. A rear inner drum housing 125 extends from the rear manifold plate 127 to the rear rotor 3. Rear drum seals 61 are provided at the rear manifold plate interface and rear drum seals 59 are provided at the rear rotor interface.

Continuing rearward along the main shaft 1, a rear commutator hub 47 is fixed to the rear rotor 3 and main shaft 1 to support a rear spinning brush slip ring insulator 45 and a rear ground slip ring 41. Around the rear spinning brush slip ring insulator 45, a rear spinning brush slip ring 43 is disposed. Rear slip ring brush 35 electrically contacts the rear spinning brush slip ring 43. Similarly, rear shaft ground brush 33 electrically contacts the rear ground slip ring 41. These brushes 33, 34 are supported by an assembly extending from the inside of the rear inner drum housing 125. A rear rotor magnet recharge commutator insulator 31 surrounds the rear commutator hub 47 rearward of the rear ground slip ring 41. A rear rotor magnet recharge commutator 37 is disposed over the rear rotor magnet recharge commutator insulator 31. A rear rotor magnet recharge brush holder 26 supports rear rotor magnet recharge brushes 29 which electrically contact the rear rotor magnet recharge commutator 37. A rear rotor seal 64 is disposed within the rear rotor 3.

Outside of the rear inner drum housing 125 a rear drive magnet plunger 21 is in communication with a rear drive magnet hub 19. The rear drive magnet plunger 21 extends from the center manifold 123 where a drive magnet plunger piston seal is located at the interface, and is supported by rear drive hub guide pins 23. The rear drive magnet hub 19 supports rear drive magnets 11 which are surrounded by rear drive magnet insulators 17 and rear drive magnet recharge plates 13. A rear drive magnet coil 15 is positioned around one of the rear drive magnet recharge plates 13 and a rear magnet ground wire 99 is similarly provided.

The rear rotor 3 has a plurality of rear rotor magnets 5 disposed along inside edges. The rear rotor magnets 5 are separated from the rotor 3 by rear rotor magnet recharge plate insulators 9. A pair of rear rotor magnet recharge plates 7 are disposed on opposite sides of each rear rotor magnet 5. A plurality of rear oil spray nozzles 25 are positioned in this vicinity for cooling and extend from the oil lines 91, 92 as was described above.

Figure 5:
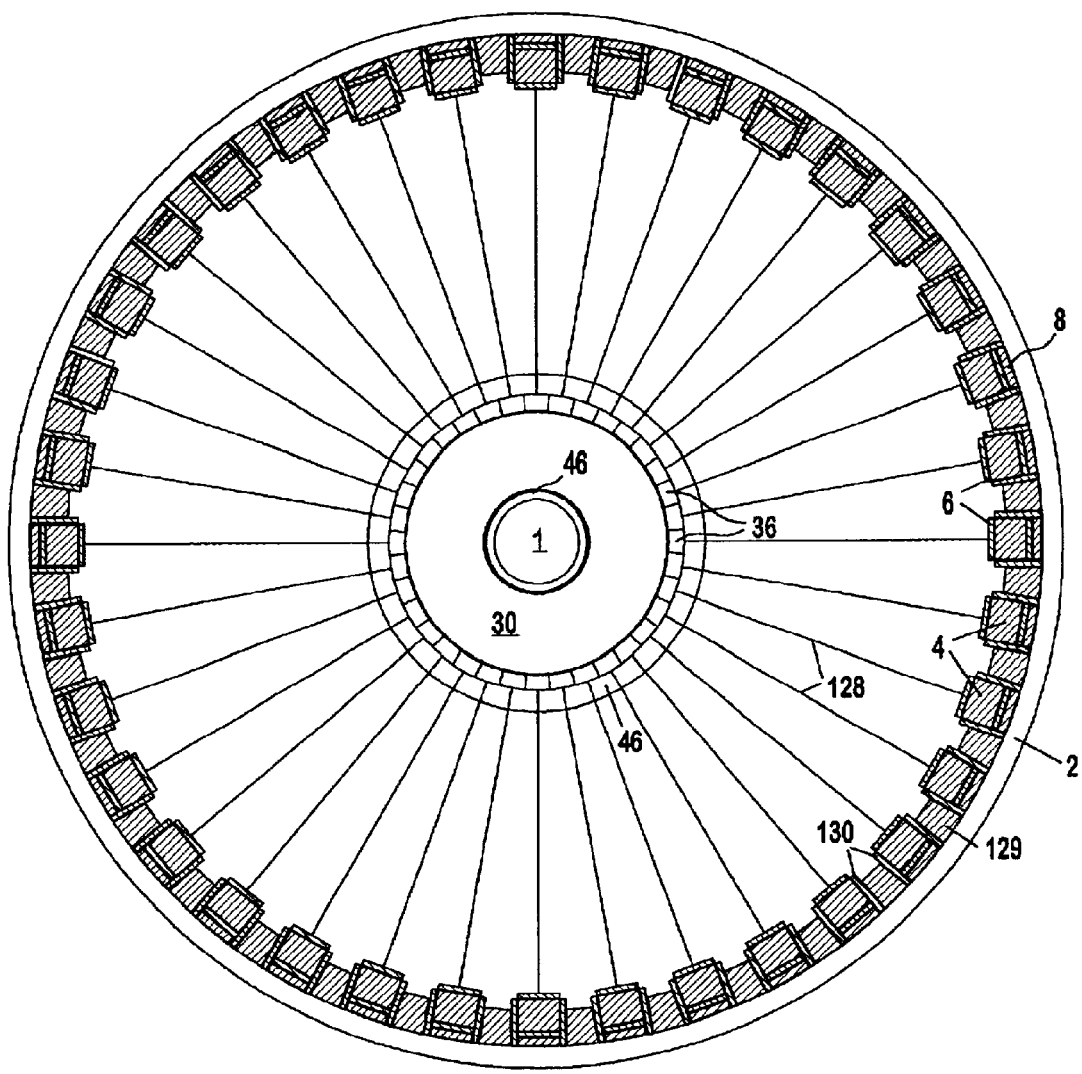
FIG. 5 is a cross-sectional view taken along the line 5—5 of FIG. 3 showing one of the rotors.

The front rotor 2 will now be described in greater detail with reference to FIG. 5. It should be understood that the rotor 3 is essentially the same and therefore only a single rotor will be described in further detail. The rotor 2 is mounted to the main shaft 1 by the front commutator hub 46. The front motor magnet recharge commutator insulator 30 surrounds the front commutator hub 46. The front motor magnet recharge commutator 36 is disposed around the front rotor magnet recharge commutator insulator 30. A plurality of wires 128 extend each from a pad on the front rotor magnet recharge commutator 36 to a respective front rotor magnet recharge plate 6 which is associated with a respective front rotor magnet 4. The hub 46 also extends outward along the edge beyond the front rotor magnet recharge commutator 36. A series of front rotor magnet recharge plate insulators 8 extend outward from each front rotor magnet recharge plate 6 and steel spacers 129 separate the magnets 4 from each other around the periphery. Magnet shields 130 are provided around each steel spacer 129. The steel spacers 129, the magnet shields 130, the front rotor magnet recharge plate insulators 8 and the magnets 4 are all suspended from an inner surface of the rotor outer periphery 2.

Figure 4:
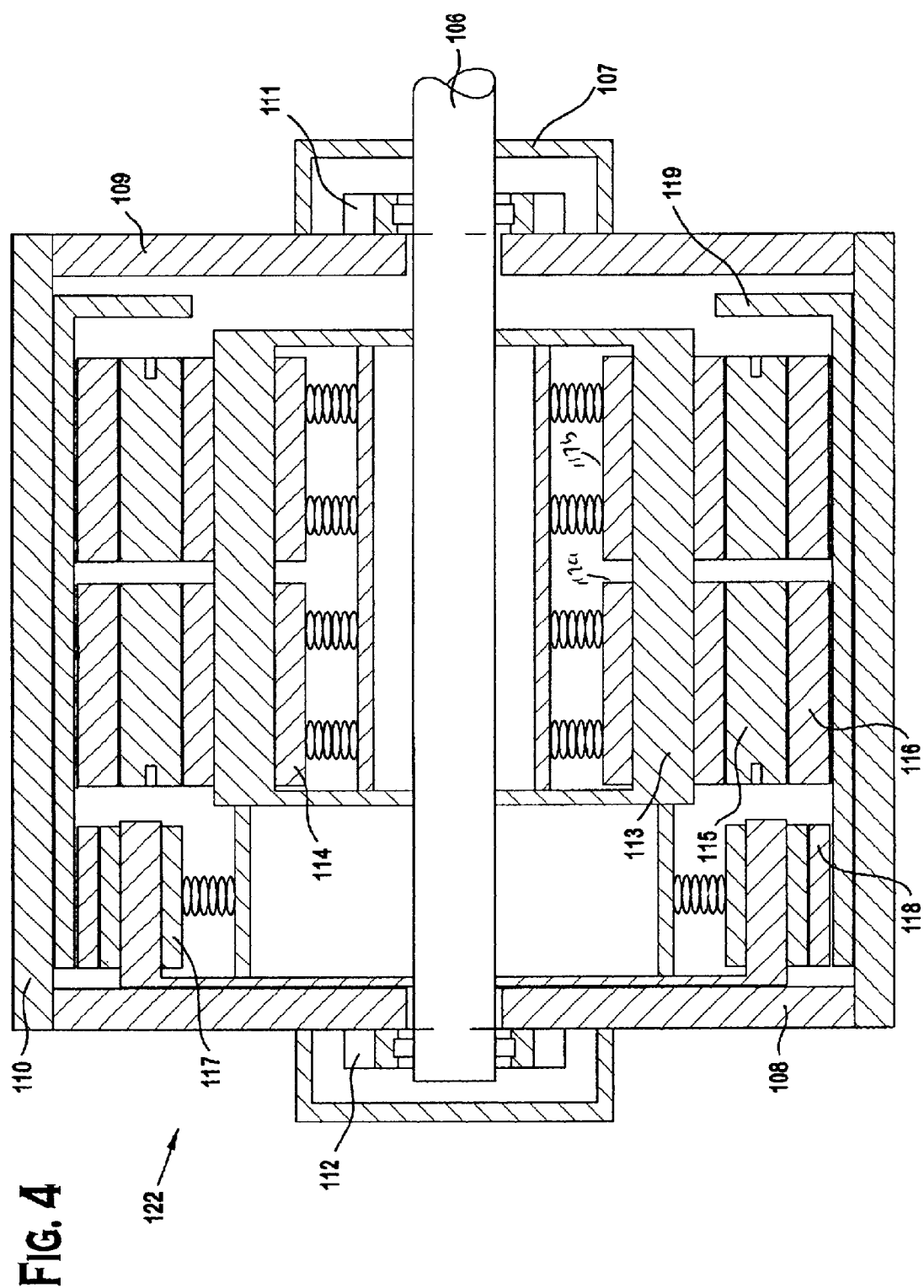
FIG. 4 is a partial cross-sectional view similar to that of FIG. 3 showing only the timing assembly.

The alternator 202 is a standard alternator used to generate a desired DC output upon rotation and therefore will not be described in further detail. Each of these figures shows alternate embodiments for placement of the brushes. In either case, the timing assembly 122 however will now be described in greater detail with reference to FIGS. 3 and 4. The timing assembly 122 is driven by a timing belt 104 and timing belt pulley 105 which are attached to the front end of a timing assembly shaft 106. A timing assembly front bearing 111 is provided at the shaft entrance in a timing assembly front end plate 109. The timing assembly outer housing 110 extends from the timing assembly front end plate 109 to timing assembly rear end plate 108. A timing assembly front cover 107 is positioned over the timing assembly front bearing 111 and shaft 106. A timing assembly rear bearing 112 is provided over the rear end shaft 106 at the timing assembly rear end plate 108. Inside the timing assembly outer housing 110 a timing assembly commutator hub 119 is provided around the shaft 106. A timing assembly commutator 115 is positioned adjacent an insulator 116 on the timing assembly commutator hub 119. Brush holder 113 is supported on the timing assembly outer housing 110 or the shaft 106 along with brushes 117a, 117b that electrically engage the commutator 115. Brushes 117 are positioned to engage a slip ring 118.

Power enters the timing assembly 122 through brushes 117. Power pulses originating on the rotating timing assembly commutator 115 pass through the pair of brushes 117a, 117b that engage the timing assembly commutator 115. These pair of brushes 117a, 117b respectively send the power pulses to the front and rear rotor magnet recharge brushes 28, 29 for selectively pulsing front rotor and rear rotor magnets 4,5. In operation, hydraulic pressure is controlled in the oil lines 91, 92 to drive front and rear drive magnet plungers 20, 21. As these plungers 20, 21 are driven outward, front and rear drive magnets 10, 11 enter the vicinity inside front and rear rotor magnets 4, 5 and in juxtaposition thereto in order to begin rotation of the front and rear rotors 2, 3. The front and rear rotors 2, 3 drive the main shaft 1. Torque and speed of the main shaft 1 is controlled by the position of the front and rear drive magnet plungers 20, 21 such that greater torque is generated when the front rotor magnet 4 and front drive magnet 10 are aligned with each other. As the front drive magnet 10 is drawn inward by the front drive magnet plunger 20 the torque generated is decreased.

The foregoing illustrates some of the possibilities for practicing the invention. Many other embodiments are possible within the scope and spirit of the invention. It is, therefore, intended that the foregoing description be regarded as illustrative rather than limiting, and that the scope of the invention is given by the appended claims together with their full range of equivalents.

What is claimed is:

1. A magnetic motor comprising:

a plurality of rotor magnets positioned along a rotor attached to a main shaft;

a plurality of drive magnets positioned along a drive magnet hub and located generally inside the rotor;

the drive magnet hub being laterally movable into and out of the inside of the rotor for the distance between the rotor magnets and the drive magnets to increase and decrease the magnetic drive force applied to the rotor magnets by the drive magnets and thereby control torque and speed of the shaft; and a timing assembly for receiving power and generating power pulses selectively supplied to each rotor magnet.

2. The magnetic motor of claim 1 wherein the plurality of drive magnets each further comprise a magnet coil being longitudinally wound around the magnet.

3. The magnetic motor of claim 1 wherein each of the drive magnets further comprises a pair of recharge plates mounted on opposite poles thereof.

4. The magnetic motor of claim 1 wherein each of the plurality of rotor magnets further comprises a pair of rotor magnet recharge plates mounted on opposite poles thereof.

5. The magnetic motor of claim 1 wherein said timing assembly is driven by said main shaft.

6. The magnetic motor of claim 1 wherein said motor further includes a magnetic motor assembly that forms a chamber in which said drive magnets and said rotor magnets are located and also includes oil supply means to provide cooling oil to said chamber wherein heat is generated during operating of the motor.

7. A magnetic motor comprising:

a plurality of front rotor magnets positioned along a front rotor attached to a main shaft;

a plurality of front drive magnets positioned along a front drive magnet hub and located generally adjacent said front rotor magnets;

said front drive magnet hub being movable with respect to the front rotor magnets for varying the distance between said front rotor magnets and said front drive magnets for increasing and decreasing the drive force applied to said front rotor magnets by said front drive magnets and thereby controlling the torque and speed of said main shaft;

a plurality of rear magnets positioned along a rear rotor attached to said main shaft;

a plurality of rear drive magnets positioned along a rear drive magnet hub and located generally adjacent to said rear rotor magnets;

the rear drive magnet hub being movable corresponding to the movement of said front magnet hub with respect to said rear rotor magnets for varying the distance between said rear rotor magnets and said rear drive magnets for increasing and decreasing the magnetic drive force applied to said rear rotor magnets by said rear drive magnets and thereby controlling torque and speed of said main shaft; and a timing assembly for receiving power and generating power pulses selectively supplied to said front and rear rotor magnets.

8. The magnetic motor of claim 7 wherein the plurality of front and rear drive magnets each have a magnet coil being longitudinally would around said magnet.

9. The magnetic motor of claim 7 wherein each of the front and rear drive magnets further comprises a pair of recharge plates mounted on opposite poles thereof.

10. A magnetic motor comprising:

a plurality of rotor magnets positioned along a rotor fixed to a main shaft;

a plurality of drive magnets positioned along a drive magnet hub and located generally adjacent to said rotor magnet;

the drive magnet hub being movable with respect to said rotor magnets for varying the distance between the rotor magnets and the drive magnets for increasing and decreasing the magnetic drive force applied to the rotor magnets by the drive magnets and thereby controlling the torque and speed of said main shaft; and said motor includes a cooling oil supply means for supplying oil to said motor magnets and said drive magnets for providing cooling to said magnets during operation of the motor.

11. A magnetic motor comprising:

a plurality of rotor magnets positioned along a rotor fixed to a main shaft;

a plurality of drive magnets positioned along a drive magnet hub and located generally inside the rotor;

the drive magnet hub being laterally movable into and out of the inside of the rotor for varying the distance between the rotor magnets and the drive magnets to increase and decrease the magnetic drive force applied to the rotor magnets by the drive magnets and thereby control torque and speed of the shaft; and said drive magnet hub is laterally movable by a plunger.

12. The magnetic motor of claim 11 wherein the plunger is operated by a hydraulic control mechanism.

13. A magnetic motor comprising:

a plurality of rotor magnets positioned along a rotor attached to a main shaft;

a plurality of drive magnets positioned along a drive magnet hub and located generally inside the rotor;

the drive magnet hub being laterally movable into and out of the inside of the rotor for varying the distance between the rotor magnets and the drive magnets to increase and decrease the magnetic drive force applied to the rotor magnets by the drive magnets and thereby control torque and speed of the shaft; and said motor further includes recharge means for said drive magnets comprising a stationary commutator associated with said main shaft and drive magnet recharge brushes in electrical contact with said commutator.

14. A magnetic motor comprising:

a plurality of front rotor magnets positioned along a front drive attached to a main shaft;

a plurality of front drive magnets positioned along a front drive magnet hub and located generally adjacent said front rotor magnets;

said front drive magnet hub being movable with respect to the front rotor magnets for varying the distance between said front rotor magnets and said front drive magnets for increasing and decreasing the drive force applied to said front rotor magnets by said front drive magnets and thereby controlling the torque and speed of said main shaft;

a plurality of rear rotor magnets positioned along a rear rotor attached to said main shaft;

a plurality of rear drive magnets positioned along a rear drive magnet hub and located generally adjacent to said rear rotor magnets;

the rear drive magnet hub being movable corresponding to the movement of said front magnet hub with respect to said rear rotor magnets for varying the distance between said rear rotor magnets and said rear drive magnets for increasing and decreasing the magnetic drive force applied to said rear rotor magnets by said rear drive magnets and thereby controlling torque and speed of said main shaft; and said front and rear magnet hubs are each movable by a plunger.

15. A magnetic motor comprising:

a plurality of front rotor magnets positioned along a front rotor attached to a main shaft;

a plurality of front drive magnets positioned along a front drive magnet hub and located generally adjacent said front rotor magnets;

said front drive magnet hub being movable with respect to the front rotor magnets for varying the distance between said front rotor magnets and said front drive magnets for increasing and decreasing the drive force applied to said front rotor magnets by said front drive magnets and thereby controlling the torque and speed of said main shaft;

a plurality of rear rotor magnets positioned along a rear rotor attached to said main shaft;

a plurality of rear drive magnets positioned along a rear drive magnet hub and located generally adjacent to said rear rotor magnets;

the drive magnet hub being movable corresponding to the movement of said front magnet hub with respect to said rear rotor magnets for varying the distance between said rear rotor magnets and said rear drive magnets for increasing and decreasing the magnetic drive force applied to said rear rotor magnets by said rear drive magnets and thereby controlling torque and speed of said main shaft; and said magnets are movable by a hydraulic control mechanism.

16. A magnetic motor comprising:

a plurality of rotor magnets positioned along a rotor fixed to a main shaft;

a plurality of drive magnets positioned along a drive magnet hub and located generally adjacent to said rotor magnet;

the drive magnet hub being movable with respect to said rotor magnets for varying the distance between the rotor magnets and the drive magnets for increasing and decreasing the magnetic drive force applied to the rotor magnets by the drive magnets and thereby controlling the torque and speed of said main shaft; and said drive magnet hub is movable by a plunger.

17. A magnetic motor comprising:

a plurality of rotor magnets positioned along a rotor fixed to a main shaft;

a plurality of drive magnets positioned along a drive magnet hub and located generally adjacent to said rotor magnet;

the drive magnet hub being movable with respect to said rotor magnets for varying the distance between the rotary magnets and the drive magnets for increasing and decreasing the magnetic drive force applied to the rotor magnets by the drive magnets and thereby controlling the torque and speed of said main shaft; and said motor further includes recharge means comprising a rotor magnet recharge commutator associated with said shaft, rotor magnet recharge brushes which electrically contact the magnet recharge commutator and conductive means extending from said recharge commutator to recharge plates associated with said rotor magnets.

* * * * *